United States Patent
Chang et al.

(10) Patent No.: US 11,408,799 B2
(45) Date of Patent: Aug. 9, 2022

(54) DEVICE AND METHOD FOR MEASURING THICKNESS OF DIELECTRIC LAYER IN CIRCUIT BOARD

(71) Applicant: Unimicron Technology Corporation, Taoyuan (TW)

(72) Inventors: Cheng-Jui Chang, Taoyuan (TW); Hung-Lin Chang, Taoyuan (TW)

(73) Assignee: Unimicron Technology Corporation, Taoyuan (TW)

( * ) Notice: Subject to any disclaimer, the term of this patent is extended or adjusted under 35 U.S.C. 154(b) by 0 days.

(21) Appl. No.: 17/209,954

(22) Filed: Mar. 23, 2021

(65) Prior Publication Data

US 2022/0221370 A1      Jul. 14, 2022

(30) Foreign Application Priority Data

Jan. 14, 2021   (TW) .................................. 110101472

(51) Int. Cl.
*G01M 11/02*      (2006.01)
*G01B 11/06*      (2006.01)

(52) U.S. Cl.
CPC ......... *G01M 11/0207* (2013.01); *G01B 11/06* (2013.01)

(58) Field of Classification Search
CPC ................................................ G01M 11/0207
(Continued)

(56) References Cited

U.S. PATENT DOCUMENTS 4,986,870 A  *  1/1991  Frohlich ............... H05K 3/4691
                                                              156/580
4,999,248 A  *  3/1991  Squire ................... C08F 234/02
                                                              428/422

(Continued)

FOREIGN PATENT DOCUMENTS

CN          203206367 U   *  9/2013
DE      102014202977 A1  *  8/2015  ........... G01B 11/005

(Continued)

OTHER PUBLICATIONS

Liu Jianping, Liang Liping, Huang Yun and Jin Shilong, Application of the Optical Fiber Prober In Measuring Micro Deep Hole of Small Laser, Chinese Journal of Lasers, Jul. 2011, 5 pages, vol. 38, No. 7, China.

*Primary Examiner* — Tarifur R Chowdhury
*Assistant Examiner* — Omar H Nixon
(74) *Attorney, Agent, or Firm* — Karin L. Williams; Alan D. Kamrath; Mayer & Williams PC

(57) ABSTRACT

A method for measuring a thickness of a dielectric layer in a circuit board is provided. The method for measuring the thickness of the dielectric layer includes the following steps. First, a circuit board including at least one dielectric layer and at least two circuit layers is provided. The dielectric layer is between the circuit layers, and the circuit board further includes a test area including a test pattern and a through hole. The test pattern includes at least two metal layers. Next, a measuring device including a main body, at least one light source and a lens module is provided. When the main body is moved into the through hole, the light source emits light to the dielectric layer and the metal layer, and the lens module shoots the dielectric layer and the metal layer to form a captured image. The thickness of the dielectric layer is obtained via the captured image.

11 Claims, 7 Drawing Sheets

(58) Field of Classification Search
USPC .......................................................... 356/124
See application file for complete search history.

(56) References Cited

U.S. PATENT DOCUMENTS

| | | | | |
|---|---|---|---|---|
| 5,000,547 | A * | 3/1991 | Squire | ................... C08F 234/02 252/589 |
| 5,006,382 | A * | 4/1991 | Squire | ................... C08F 234/02 428/422 |
| 5,212,540 | A | 5/1993 | Miller | |
| 6,166,819 | A | 12/2000 | Schnabel | |
| 2020/0348359 | A1 | 11/2020 | Weiss et al. | |
| 2021/0028101 | A1 * | 1/2021 | Nie | ................... H01L 23/49838 |

FOREIGN PATENT DOCUMENTS

| | | | |
|---|---|---|---|
| TW | 200928286 | A | 7/2009 |
| TW | 201821818 | A | 6/2018 |
| TW | 202030454 | A | 8/2020 |
| WO | WO9802756 | A2 | 1/1998 |

* cited by examiner

8P

DEVICE AND METHOD FOR MEASURING THICKNESS OF DIELECTRIC LAYER IN CIRCUIT BOARD

FIELD OF THE DISCLOSURE

The present invention relates to a device and a method for measuring a thickness of a dielectric layer in a circuit board, and more particularly to the device and the method for measuring the thickness of the dielectric layer in the circuit board including a light source and a lens module.

BACKGROUND OF THE INVENTION

Currently, the thickness of the dielectric layer of the circuit board is mainly measured by destructive methods. For example, partial circuit board must be removed to be a measuring slice, firstly. Next, using optical microscope or scanning electron microscope to measure the thickness. However, such prior art is very time-consuming and labor-intensive, and it will also damage a larger area of the circuit board and cause the circuit board to be scrapped.

Therefore, how to measure the thickness of the dielectric layer in the circuit board quickly and easily is worth considering for person having ordinary skill in the art.

SUMMARY OF THE INVENTION

The objective of the present invention is to provide a method for measuring a thickness of a dielectric layer in a circuit board. The method for measuring the thickness of the dielectric layer in the circuit board can quickly and easily measure the thickness of the dielectric layer in the circuit board without damaging the circuit board.

The method for measuring the thickness of the dielectric layer in the circuit board in the present invention includes the following steps.

First, a circuit board including at least one dielectric layer and at least two circuit layers is provided. The dielectric layer is between the circuit layers, and the circuit board further includes a test area. The test area includes a test pattern and a through hole. The test pattern includes at least two metal layers. The metal layer is a part of the circuit layer. The side surface of the through hole includes a section of the dielectric layer and a section of the metal layer.

Next, a measuring device including a main body, at least one light source and a lens module is provided. The light source and the lens module are on the main body. The main body is moved into the through hole. When the main body is moved into the through hole, the light source emits light to the dielectric layer and the metal layer, and the lens module shoots the dielectric layer and the metal layer to form a captured image. The thickness of the dielectric layer is obtained via the captured image.

In the method for measuring the thickness of the dielectric layer in the circuit board, the light source and the lens module are on the same side of the main body.

In the method for measuring the thickness of the dielectric layer in the circuit board, a number of the light sources is plural, and the light sources and the lens module are at one end of the main body, and the lens module is surrounded by the light sources.

In the method for measuring the thickness of the dielectric layer in the circuit board, the light source is a light emitting diode.

In the method for measuring the thickness of the dielectric layer in the circuit board, the lens module is a CCD lens module or a CMOS lens module.

Another objective of the present invention is to provide a measuring device. The measuring device can quickly and easily measure a thickness of a dielectric layer in a circuit board without damaging the circuit board.

The measuring device of the present invention is used to measure a thickness of a dielectric layer of a circuit board. The circuit board includes at least one dielectric layer and at least two circuit layers. The dielectric layer is between the circuit layers. The circuit board further includes a test area. The test area includes a test pattern and a through hole. The test pattern includes at least two metal layers. The metal layer is a part of the circuit layer. The side surface of the through hole includes a section of the dielectric layer and a section of the metal layer. The measuring device includes a main body, a light source and a lens module. The main body is moved into the through hole, and the light source and the lens module are on the main body. When the main body is moved into the through hole, the light source emits light to the dielectric layer and the metal layer, and the lens module shoots the dielectric layer and the metal layer to form a captured image.

In the measuring device, the light source and the lens module are on the same side of the main body.

In the measuring device, a number of the light sources is plural, and the light sources and the lens module are at one end of the main body, and the lens module is surrounded by the light sources.

In the measuring device, the light source is a light emitting diode.

In the measuring device, the lens module is a CCD lens module or a CMOS lens module.

In the measuring device, a number of layers of the metal layer is plural.

The present invention has the following advantages:

Only by forming a through hole in the pre-set test area, the measuring device can be moved into the through hole to shoot the dielectric layer of the circuit board. The required area of the circuit board is small, and the circuit board will not be damaged.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
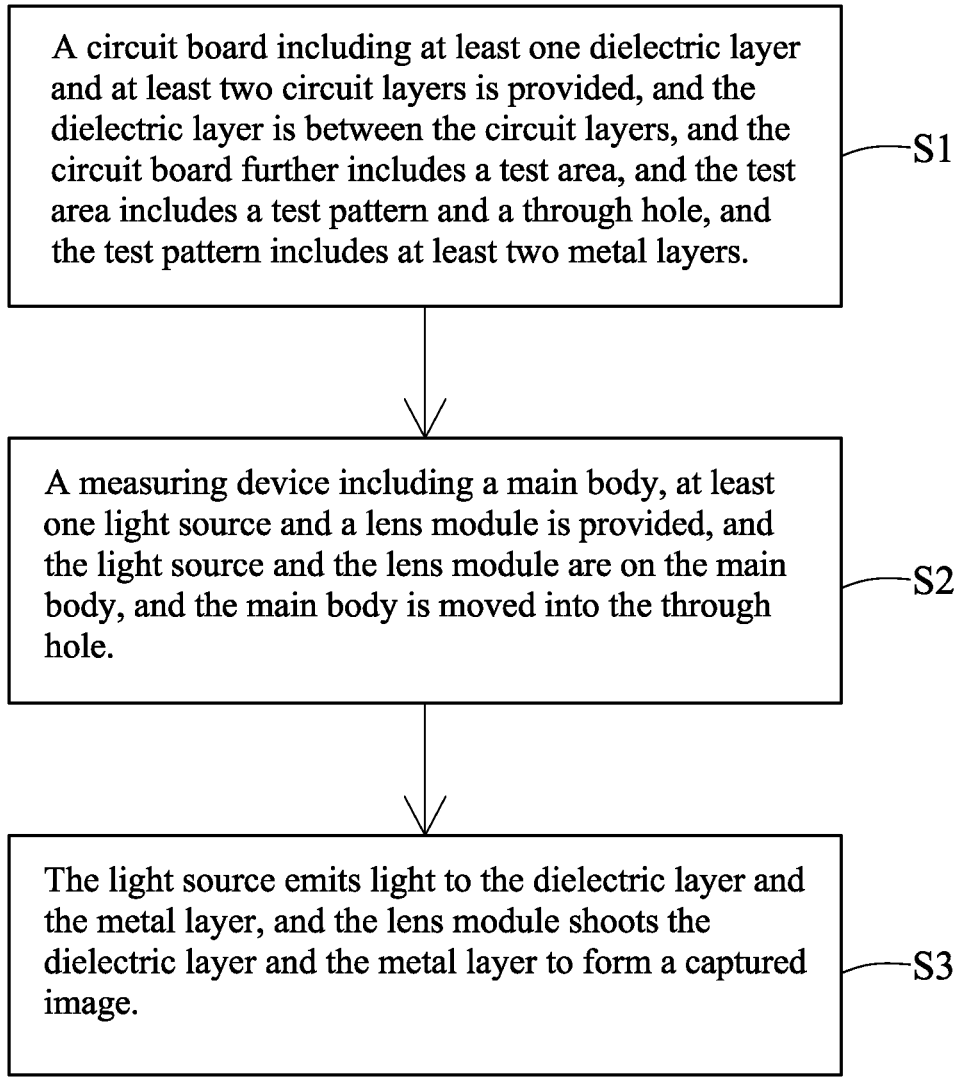
FIG. 1 illustrates a schematic diagram of a method for measuring a thickness of a dielectric layer in a circuit board of the present invention.

Please refer to FIG. 1. FIG. 1 illustrates a schematic diagram of a method for measuring a thickness of a dielectric layer in a circuit board of the present invention. The method for measuring the thickness of the dielectric layer in the circuit board in the present invention includes the following steps.

Figure 2A:
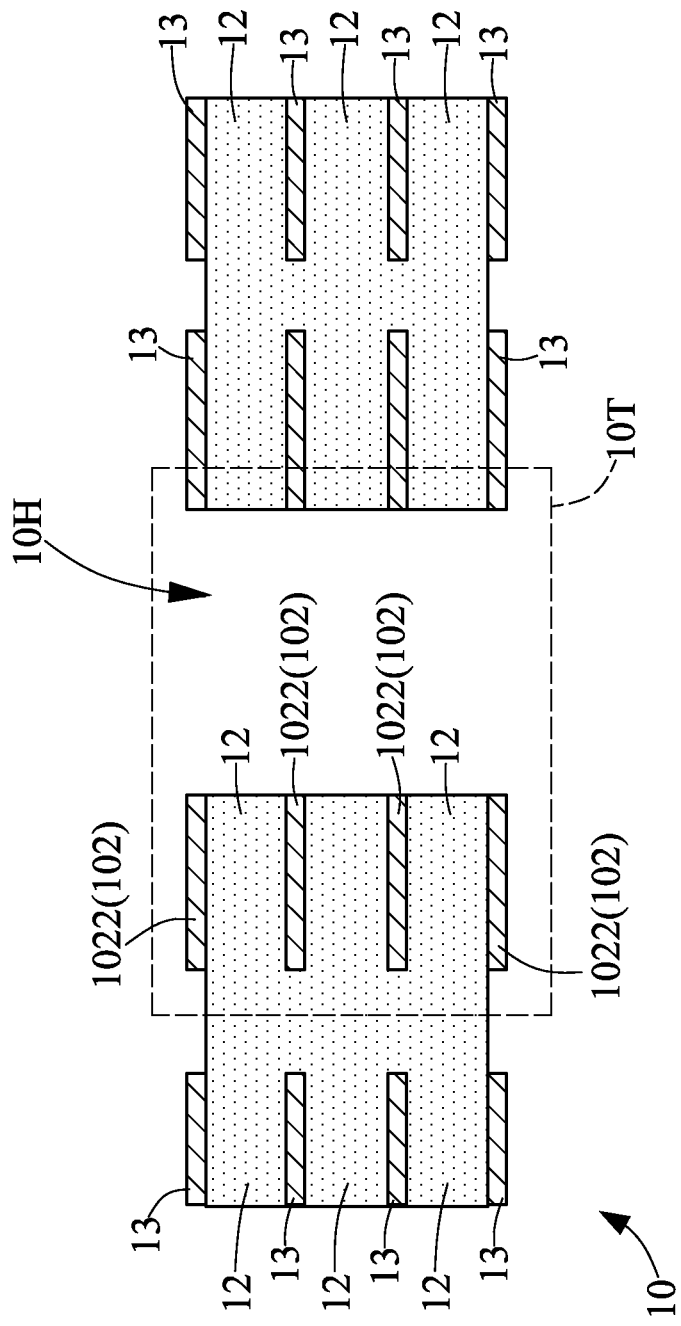
FIG. 2A illustrates a schematic diagram of a partial section of a circuit board 10.

First, please refer the step S1 and FIG. 2A. FIG. 2A illustrates a schematic diagram of a partial section of a circuit board 10. A circuit board 10 including three dielectric layers 12 and four circuit layers 13 is provided. However, person having ordinary skill in the art should understand that in practice, the circuit board 10 may include more dielectric layers 12 and circuit layers 13, or the circuit board 10 may only include one dielectric layer 12 and two circuit layers 13. Moreover, the dielectric layer 12 is between the two circuit layers 13.

In addition, the circuit board 10 further includes a test area 10T, and the test area 10T includes a test pattern 102 and a through hole 10H. The test pattern 102 includes at least two metal layers 1022. The metal layer 1022 is a part of the circuit layer 13. In detail, in the manufacturing process of the circuit board 10, the metal layer 1022 and the circuit layer 13 are formed at the same time, so the number of layers of the metal layer 1022 in the embodiment is the same as the circuit layer 13 in four layers. In the embodiment, the side surface of the through hole 10H includes a section of the dielectric layer 12 and a section of the metal layer 1022. In other words, the dielectric layer 12 and the second conductor 1022 are appeared on the side surface of the through hole 10H.

Figure 2B:
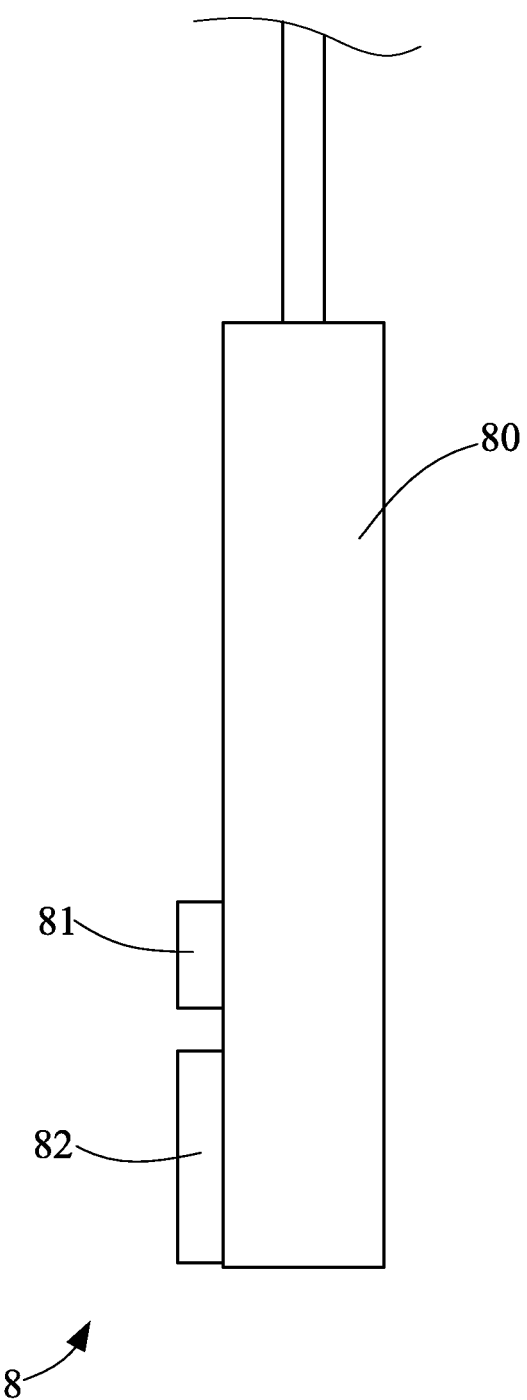
FIG. 2B illustrates a schematic diagram of a measuring device 8.

Next, please refer to the step S2 and FIG. 2B. FIG. 2B illustrates a schematic diagram of a measuring device 8. A measuring device 8 is provided. The measuring device 8 includes a main body 80, a light source 81 and a lens module 82. The light source 81 is such as a light emitting diode (LED). The lens module 82 is such as a charge coupled device (CCD) lens module or a complementary metal-oxide-semiconductor (CMOS) lens module. The light source 81 and the lens module 82 are on the same side of the main body 80. The main body is moved into the through hole.

Figure 3A:
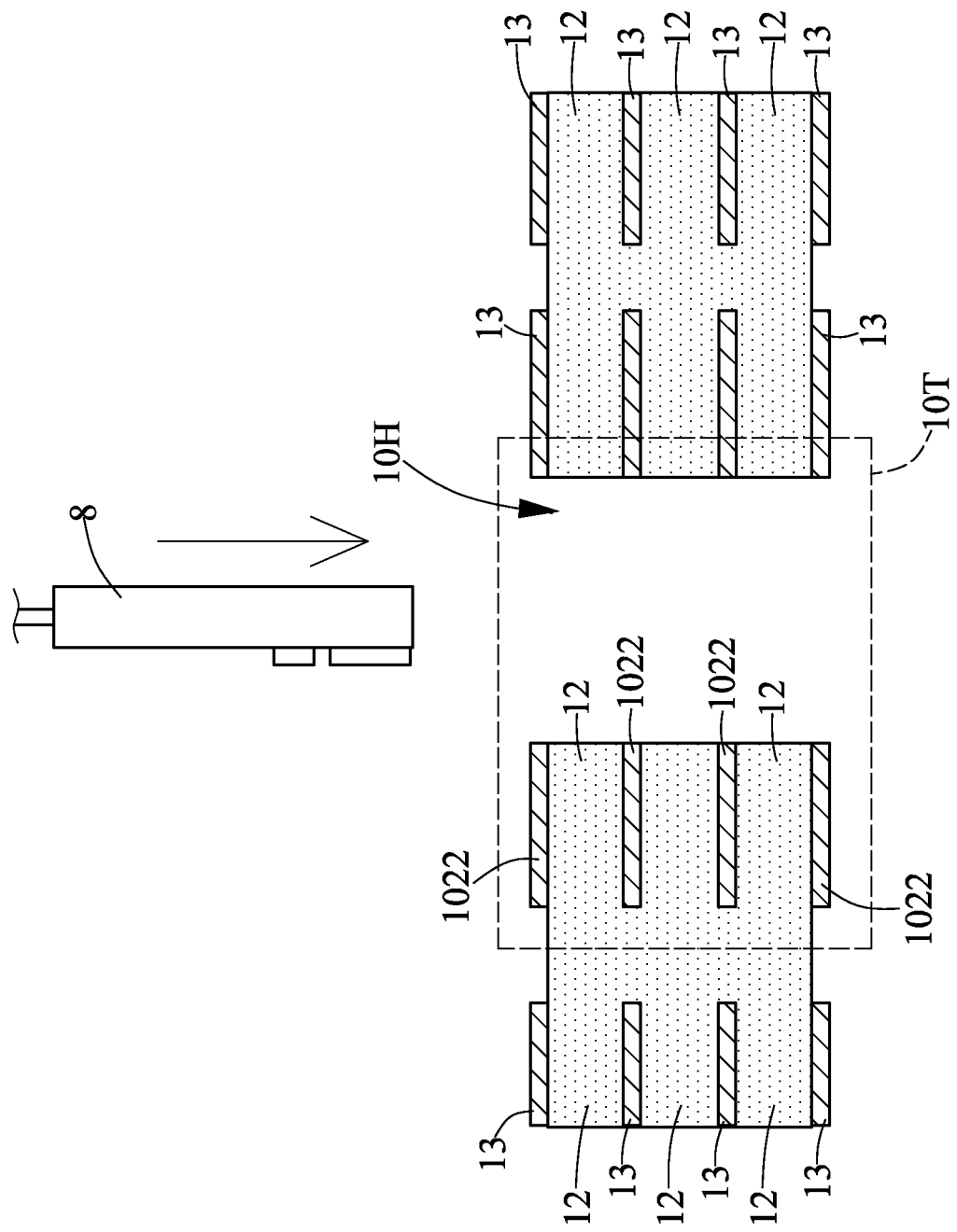
FIG. 3A illustrates the schematic diagram of the measuring device 8 being about to enter a through hole 10H.
Figure 3B:
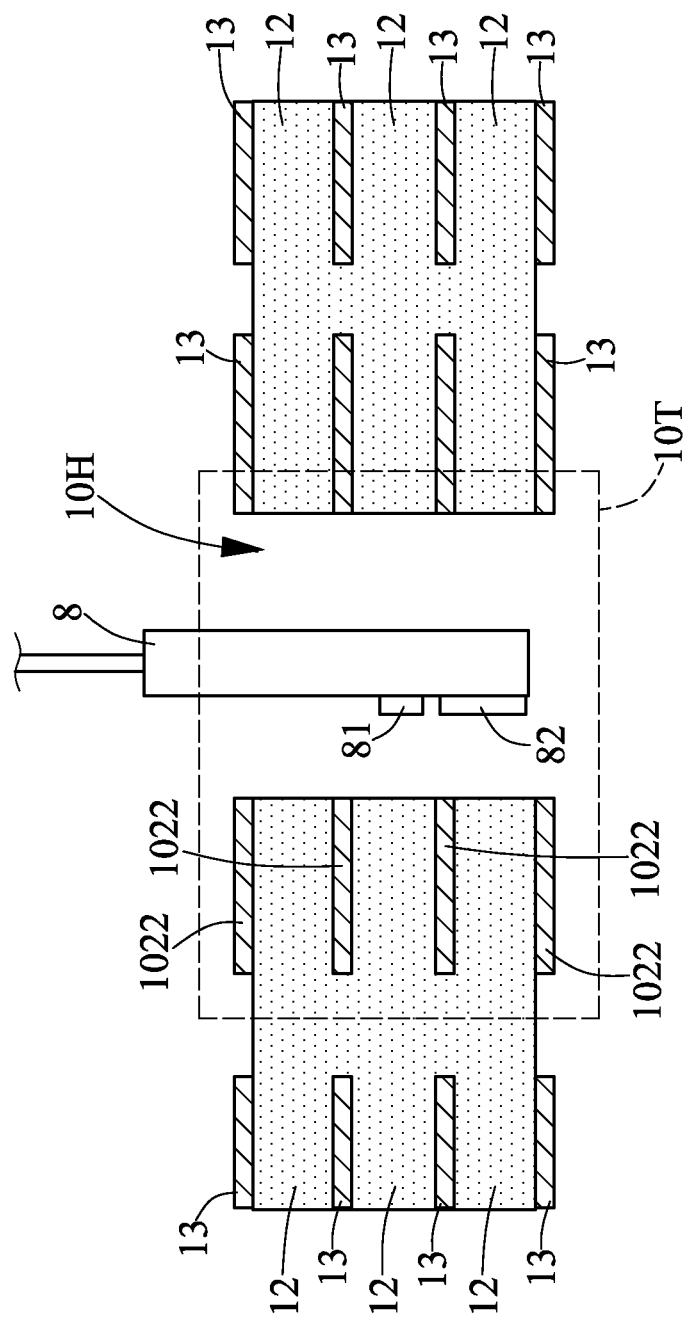
FIG. 3B illustrates the schematic diagram of the measuring device 8 moving into the through hole 10H.
Figure 3C:
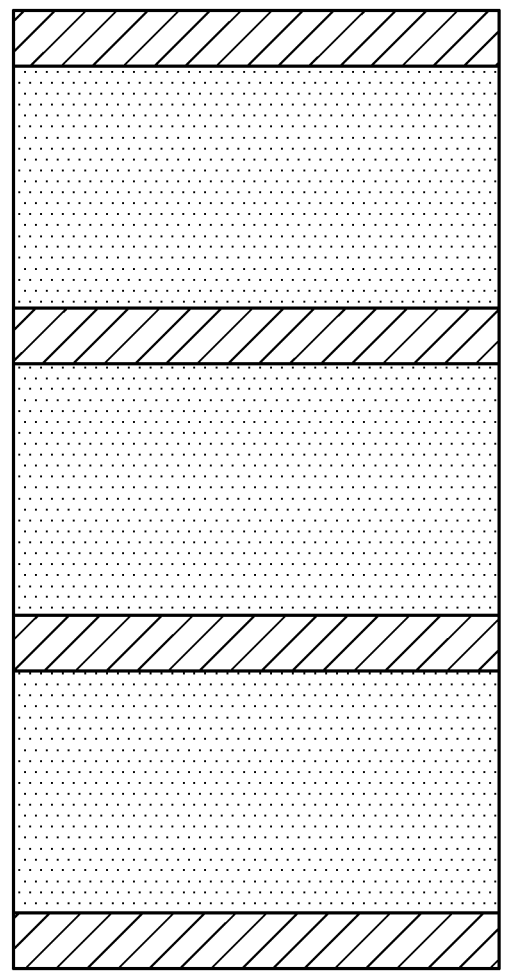
FIG. 3C illustrates the schematic diagram of a captured image 8P.

Next, please refer to the step S3 and FIG. 3A to FIG. 3C. FIG. 3A illustrates the schematic diagram of the measuring device 8 being about to enter a through hole 10H. FIG. 3B illustrates the schematic diagram of the measuring device 8 moving into the through hole 10H. FIG. 3C illustrates the schematic diagram of a captured image 8P. When the main body 80 is moved into the through hole 10H, the light source 81 emits light to the dielectric layer 12 and the metal layer 1022, and the lens module 82 simultaneously shoots the dielectric layer 12 and the metal layer 122 to form a captured image 8P. During the shooting process, the lens module 82 can shoot a plurality of the dielectric layers 12 and the metal layers 1022 at a time to form the captured image 8P. Alternatively, the lens module 82 can also shoot the dielectric layers 12 and metal layers 1022 in stages from top to bottom to form photos, and then merge the photos to form the captured image 8P in a post-production.

Because the material of the metal layer 1022 is metal, it has a higher light reflectivity than the dielectric layer 12. Thus, the thickness of each dielectric layer 12 can be calculated via the bright part and dark part formed by the contrast difference of light reflection between the metal layer 1022 and the dielectric layer 12 in the captured image 8P. Therefore, compared to the traditional method of measuring the thickness of the dielectric layer of the circuit board, the method for measuring the thickness of the dielectric layer in the circuit board in the present invention can quickly and easily measure the thickness of the dielectric layer in the circuit board without damaging the circuit board.

Figure 4:
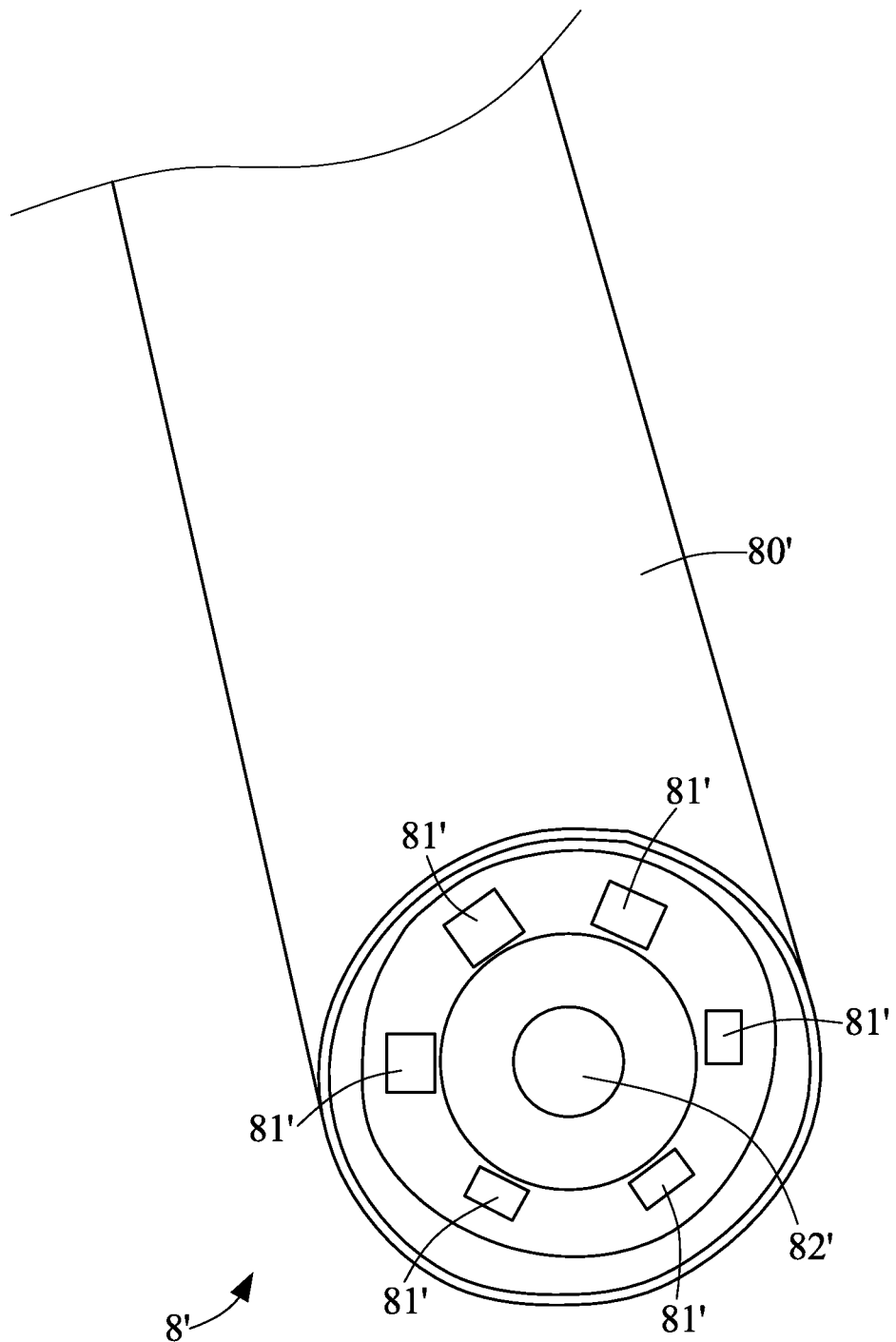
FIG. 4 illustrates the schematic diagram of a measuring device 8' of another embodiment.

Please refer to FIG. 4. FIG. 4 illustrates the schematic diagram of a measuring device 8' of another embodiment. In the embodiment of FIG. 4, a number of the light source 81' of the measuring device 8' is plural. The light sources 81' and the lens module 82' are at one end of the main body 80', and the lens module 82' is surrounded by the light sources. During the shooting process, the lens module 82' shoots the dielectric layer 12 layer after layer to form photos, and then merges the photos to form the captured image 8P in a post-production.

In summary, the present invention only needs to form a through hole 10H in the pre-set test area 10T, the measuring device 8 or measuring device 8' is able to move to the through hole 10H to measure the thickness of the dielectric layer 12 of each layer in the circuit board 10, since the required area to be tested is small and conveniently tested. Therefore, compared to the prior arts, the present invention can quickly and easily measure the thickness of the dielectric layer in the circuit board without damaging the circuit board.

Although the description above contains many specifics, these are merely provided to illustrate the invention and should not be construed as limitations of the invention's scope. Thus, it will be apparent to those skilled, in the art that various modifications and variations can be made in the system and processes of the present disclosure without departing from the spirit or scope of the invention.

What is claimed is:

1. A method for measuring a thickness of a dielectric layer in a circuit board comprising:
   providing a circuit board having at least one dielectric layer and at least two circuit layers, the dielectric layer being between the circuit layers, the circuit board further comprising a test area having a test pattern and a through hole, the test pattern having at least two metal layers, the metal layer being a part of the circuit layer, the side surface of the through hole having a section of the dielectric layer and a section of the metal layer; and
   providing a measuring device having a main body, at least one light source and a lens module, the light source and the lens module being on the main body, moving the main body into the through hole;
   wherein when the main body is moved into the through hole, the light source emits light to the dielectric layer and the metal layer, and the lens module shoots the dielectric layer and the metal layer to form a captured image, and the thickness of the dielectric layer is obtained via the captured image.

2. The method for measuring the thickness of the dielectric layer in the circuit board of claim 1, wherein the light source and the lens module are on the same side of the main body.

3. The method for measuring the thickness of the dielectric layer in the circuit board of claim 1, wherein a number of the light sources is plural, and the light sources and the lens module are at one end of the main body, and the lens module is surrounded by the light sources.

4. The method for measuring the thickness of the dielectric layer in the circuit board of claim 1, wherein the light source is a light emitting diode.

5. The method for measuring the thickness of the dielectric layer in the circuit board of claim 1, wherein the lens module is a CCD lens module or a CMOS lens module.

6. A measuring device used to measure a thickness of a dielectric layer of a circuit board, the circuit board having at least one dielectric layer and at least two circuit layers, the dielectric layer being between the circuit layers, the circuit board further comprising a test area having a test pattern and a through hole, the test pattern having at least two metal layers, the metal layer being a part of the circuit layer, the side surface of the through hole having a section of the dielectric layer and a section of the metal layer, the measuring device comprising:

a main body, moved into the through hole;
a light source, disposed on the main body; and
a lens module, disposed on the main body;
wherein when the main body is moved into the through hole, the light source emits light to the dielectric layer and the metal layer, and the lens module shoots the dielectric layer and the metal layer to form a captured image.

7. The measuring device of claim 6, wherein the light source and the lens module are on the same side of the main body.

8. The measuring device of claim 6, wherein the number of the light sources is multiple, and the light sources and the lens module are at one end of the main body, and the lens module is surrounded by the light sources.

9. The measuring device of claim 6, wherein the light source is a light emitting diode.

10. The measuring device of claim 6, wherein the lens module is a CCD lens module or a CMOS lens module.

11. The measuring device of claim 6, wherein a number of layers of the metal layer is plural.

* * * * *